United States Patent [19]

Fimeri

[11] Patent Number: 4,830,327

[45] Date of Patent: May 16, 1989

[54] REAR VISION MIRROR ADJUSTING MEANS

[75] Inventor: Garry G. L. Fimeri, Lonsdale, Australia

[73] Assignee: Britax Rainsfords Pty. Ltd., Lonsdale, Australia

[21] Appl. No.: 190,011

[22] Filed: May 4, 1988

[30] Foreign Application Priority Data

May 4, 1987 [AU] Australia ................. PI1722

[51] Int. Cl.$^4$ ................. G02B 7/18
[52] U.S. Cl. ................. 248/481; 248/487; 350/636
[58] Field of Search ................. 248/466, 475.1, 476, 248/479, 481, 482, 483, 484, 487, 181, 288.3; 350/631, 632, 635, 636, 640

[56] References Cited

U.S. PATENT DOCUMENTS

| | | | |
|---|---|---|---|
| 4,171,873 | 10/1979 | Repay | 248/479 |
| 4,572,626 | 2/1986 | Suzuki | 248/487 |
| 4,678,295 | 7/1987 | Fisher | 248/481 |

FOREIGN PATENT DOCUMENTS

| | | | |
|---|---|---|---|
| 3032392 | 3/1982 | Fed. Rep. of Germany | 248/900 |
| 2576567 | 8/1986 | France | 350/632 |
| 22543 | 2/1985 | Japan | 350/632 |
| 160711 | 7/1986 | Japan | 350/632 |
| 1600425 | 10/1981 | United Kingdom | 248/484 |

Primary Examiner—Alvin C. Chin-Shue
Assistant Examiner—Robert A. Olson
Attorney, Agent, or Firm—Klauber & Jackson

[57] ABSTRACT

A rear vision mirror assembly has a mounting member to which a mirror backing plate is pivoted for tilting about two planes (a "universal" tilt), a mirror carried on the backing plate, and a blade which projects from the mounting plate and which frictionally engages a metal spring retainer or spring retainers.

5 Claims, 1 Drawing Sheet

REAR VISION MIRROR ADJUSTING MEANS

This invention relates to adjusting means for a rear vision mirror assembly of a motor vehicle.

BACKGROUND OF THE INVENTION

Rear vision mirrors of various types are used, both internally and externally of the vehicle, but one thing which is common to all rear vision mirrors is that they require to be moved universally about a pivotal mount so that they can be tilted in a vertical plane or moved in an horizontal plane.

In many instances rear vision mirrors have elements made from plastic material which is very responsive to temperature change, so that on a hot day for example sometimes a mirror will lose its adjusted position if the vehicle is being driven over rough terrain.

The main object of this invention is to provide an improvement whereby less reliance is placed on the "universal" joint (usually a ball joint) and sufficient friction exists that once an adjustment has been made it will remain.

BRIEF SUMMARY OF THE INVENTION

In this invention, a rear vision mirror assembly has a mounting member to which a mirror backing plate is pivoted for tilting about two planes (a "universal" tilt), a mirror carried on the backing plate, and a blade which projects from the mounting plate and which frictionally engages a metal spring retainer or spring retainers.

By frictional engagement of a blade projecting from the mounting plate, advantage can be taken of the moment arm since the blade can be located a considerable distance from the axis of tilt, and sufficient friction to resist tilting of the mirror can be imparted by simple spring means against side faces of the blade, the degree of friction varying by only a small amount due to temperature change.

More specifically, in this invention a rear vision mirror assembly comprises a mounting member, a mirror, a mirror backing member carrying the mirror, socket walls defining a socket on one said member, a ball stem projecting from the other said member and terminating in a mounting ball which frictionally engages said socket walls so that the mirror mounting member is tiltable with respect to the backing member in two tilting planes angularly displaced from each other, at least one metal spring retainer carried by one of said members, and at least one blade, each blade being carried on a respective stem which terminates in a ball which engages a further respective socket defined by socket walls in the other said member, and each blade engaging the corresponding spring retainer with sufficient friction to resist tilting of the mirror backing plate with respect to the mounting member.

BRIEF DESCRIPTION OF THE DRAWINGS

An embodiment is described hereunder in some detail with reference to and is illustrated in the accompanying drawings in which.

BRIEF DESCRIPTION OF THE PREFERRED EMBODIMENT

Figure 2:
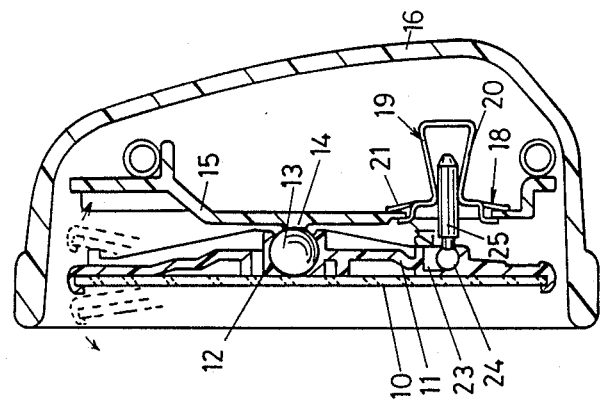
FIG. 2 is a cross-section taken on line 2—2 of FIG. 1, showing also the mirror.

A mirror 10 is carried by a mirror backing plate 11 which has walls 12 defining a part-spherical socket in which a ball 13 is located, the ball 13 being carried on the end of a short stem 14 projecting from mounting plate 15 to which is secured a cover 16 of a mirror assembly.

The backing plate 11 mounting plate 15 is provided with two apertures 18, and a pair of retainers 19 formed from spring strip metal each having a pair of legs 20 joined at one end by a bridge portion to define a general "U" shape, the legs 20 being outturned at their outer ends to provide flanges 21 which engage upper and lower surfaces of the mounting plate 15 and thereby locate the retainers 19 with respect to the mounting plate 15.

The mirror backing plate 11 is provided with a pair of sockets 23 also of part-spherical shape and these sockets 23 retain balls 24 for pivotal movement of blades 25. The balls 24 are much smaller than the ball 13, but nevertheless allow free pivotal movement of the blades 25 which movement however is snubbed by the frictional engagement by the sides of the blades 25 against the legs 20 of the retainers 19.

Figure 1:
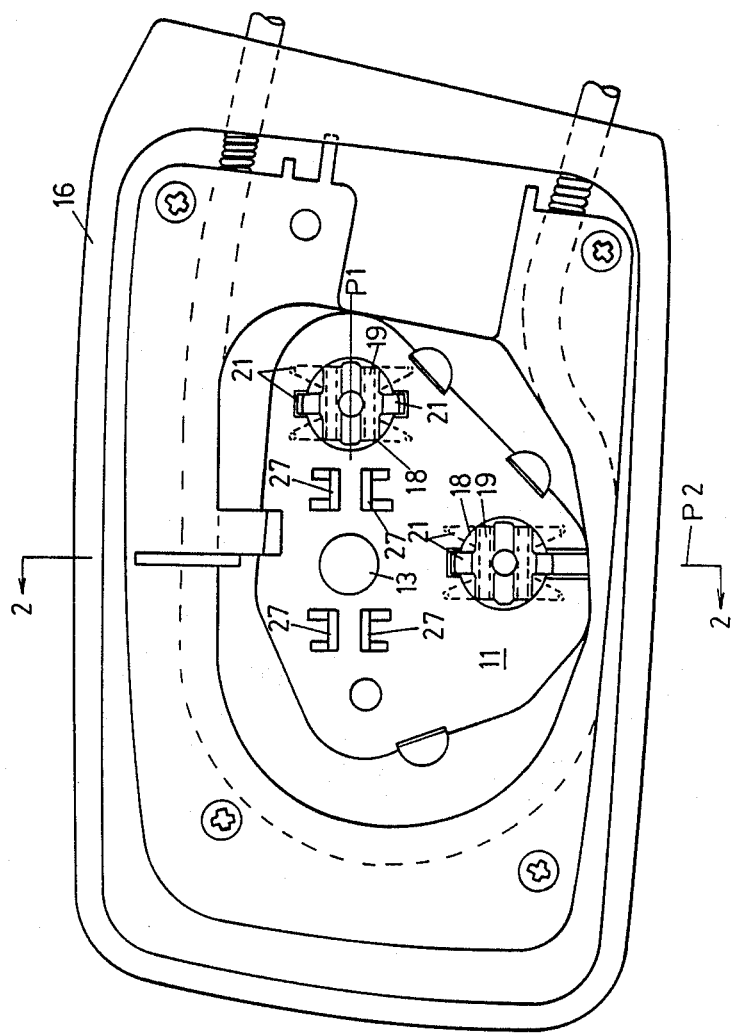
FIG. 1 is an elevation showing the backing plate and cover of a rear vision mirror assembly of the type which may be mounted on a motor vehicle.

The ball 13 allows "universal" movement of the backing plate 11 in two planes which are marked P1 and P2 in FIG. 1. These are desirably but not essentially at right angles to each other as shown, and the blades 25 can also pivot in those planes. To restrain the backing plate 11 against rotational movement, the mounting plate 15 is provided with two pairs of spaced lugs 27 which extend outwardly towards the backing plate 11 and are engaged by webs therein which are not however illustrated. Sufficient clearance exists however between the lugs 27 and the webs to allow tilting in both the planes.

A consideration of the above embodiment will indicate the invention overcomes one of the more difficult problems associated with rear vision mirrors, and does so for a very low cost.

The claims defining the invention are as follows:

1. A rear vision mirror assembly comprising a mounting member, a mirror, a mirror backing member carrying the mirror, socket walls defining a socket on one said member, a ball stem projecting from the other said member and terminating in a mounting ball which frictionally engages said socket walls so that the mirror mounting member is tiltable with respect to the backing member in two tilting planes angularly displaced from each other, at least one metal spring retainer carried by one of said members, and at least one blade, each blade slidably held in a respective spring retainer and terminating in a ball which engages a further respective socket defined by socket walls in the other said member, and each spring retainer engaging the corresponding blade with sufficient frictin to resist tilting of the mirror backing plate with respect to the mounting member.

2. A rear vision mirror assembly according to claim 1 wherein each said member is a plate, and wherein there are two metal spring retainers carried by one of said plates each spaced from said mounting ball lying in respective said tilting planes, and two blades carried by the other said plate engaging respective said spring retainers each with sufficient friction to resist tilting of the mirror backing plate with respect to the mounting plate.

3. A rear vision mirror assembly according to claim 2 wherein said ball projects from and is carried by the mounting plate, and said socket walls project from and are carried by the mirror backing plate.

4. A rear vision mirror assembly comprising a mounting plate, a mirror, a mirror backing plate carrying the mirror, socket walls defining a socket on one said plate, a ball stem projecting from the other said plate and terminating in a mounting ball which frictionally engages said socket walls so that the mirror mounting plate is tiltable with respect to the backing plate in two tilting planes angularly displaced from each other,
   wherein there are two metal spring retainers carried by one of said plates, each spaced from said mounting ball lying in respective said tilting planes, and two blades carried by the other said plate engaging respective said spring retainers each with sufficient friction to resist tilting of the mirror backing plate with respect to the mounting plate, and
   wherein said mounting plate contains two apertures each of which contains a respective said spring retainer, each spring retainer having a pair of spring legs each joined to the other by a bridge portion to define a general "U" shape, said blades engaging facing surfaces of said legs.

5. A rear vision mirror assembly comprising a mounting plate, a mirror, a mirror backing plate carrying the mirror, socket walls defining a socket on one said plate, a ball stem projecting from the other said plate and terminating in a mounting ball which frictionally engages said socket walls so tht the mirror mounting plate is tiltable with respect to the backing plate in two tilting planes angularly displaced from each other,
   wherein there are two metal spring retainers carried by one of said plates, each spaced from said mounting ball lying in respective said tilting planes, and two blades carried by the other said plate engaging respective said spring retainers each with sufficient friction to resist tilting of the mirror backing plate with respect to the mounting plate, and
   wherein each said spring retainer comprises a pair of spaced spring legs slidably engaged by a respective said blade, and flanges which engage the mounting plate and retain that said retainer thereto, said blades projecting from the mirror backing plate.

* * * * *